UNITED STATES PATENT OFFICE.

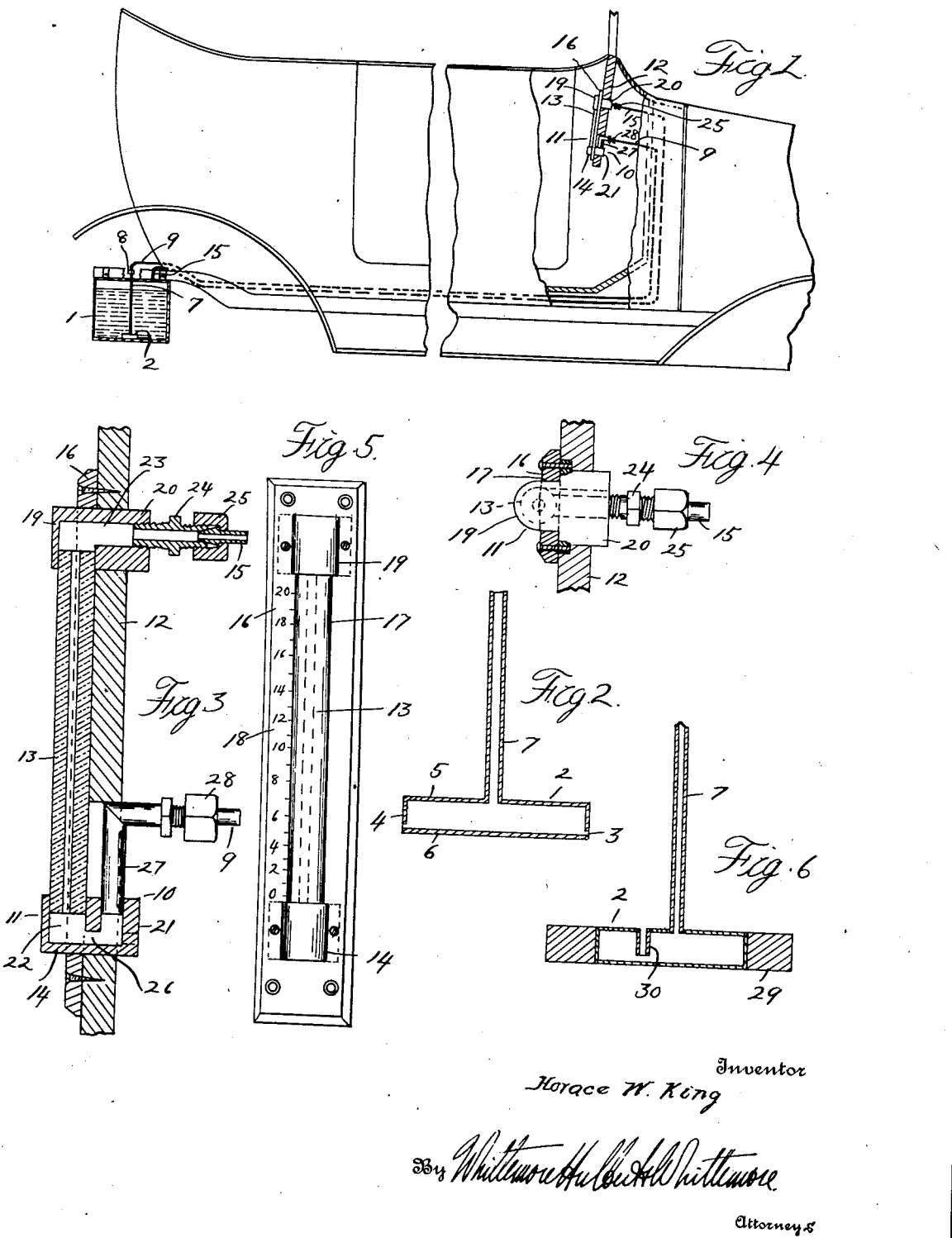

HORACE W. KING, OF ANN ARBOR, MICHIGAN.

DEPTH-INDICATING DEVICE.

1,364,503.  Specification of Letters Patent.  Patented Jan. 4, 1921.

Application filed January 25, 1919. Serial No. 273,026.

*To all whom it may concern:*

Be it known that I, HORACE W. KING, a citizen of the United States of America, residing at Ann Arbor, in the county of Washtenaw and State of Michigan, have invented certain new and useful Improvements in Depth-Indicating Devices, of which the following is a specification, reference being had therein to the accompanying drawings.

The invention relates generally to devices for indicating the depths of liquids and comprises a construction which is exceedingly simple and which may be cheaply manufactured.

In the manufacture of depth measuring devices in the past their construction has been such that compensating mechanism for taking care of temperature changes and variations in the amounts of the liquid being measured to correctly indicate the depth of the liquid being measured was necessary, which mechanism greatly complicated the device and added considerably to the cost of manufacture of the same and also to the cost of maintenance.

My construction is such that the percentage of error in operation of the device is very small, so small, in fact, as to be negligible.

In the drawings:

Figure 1 is a side elevation, partly in section, of a construction embodying my invention;

Fig. 2 is a cross section through the air chamber;

Figs. 3, 4 and 5 are respectively an enlarged longitudinal section, front elevation, and top plan view of the gage;

Fig. 6 is a cross section through a modified air chamber.

My depth measuring device has a number of uses, such as measuring the depth of natural bodies of water, of liquids held in containers and the draft of floating objects. It is necessary in order that my device may operate accurately that the area of a horizontal section of the air chamber which is immersed in the liquid, be many times greater than the inner cross sectional area of the pressure tube or connection between the air chamber and the indicating gage, and that the height of the air chamber be relatively small as compared to the depth of the liquid to be measured. By this arrangement the pressure in the air chamber is approximately equal to the pressure of the liquid above the bottom of the container on which the air chamber rests. Moreover, due to the relatively large cross sectional area of the air chamber with respect to that of the pressure tube or connection and also due to the relatively small height of the air chamber with respect to its volume, corrections are automatically made within very small limits for fluctuations caused by the expansion and contraction of the air in the air chamber and pressure tube or connection.

In the drawings, one of the embodiments of my invention is specifically shows as follows: 1 is a gasolene tank upon an automobile to which the device is applied. 2 is the air chamber located at the bottom of the tank 1 and communicating near its bottom through apertures 3 with the tank contents. This air chamber is of suitable cross section and has the vertical side walls 4 and parallel plane top and bottom, 5 and 6 respectively. The vertical distance between the top and bottom must be small as compared to the depth of the gasolene in the tank when the latter is full, the smaller the percentage of this distance to this depth the greater the relative accuracy. In practice, it has been found desirable to have this vertical distance from four to seven per cent. of the depth of the liquid in the tank when full. 7 is a rigid metal tube of small bore, connecting into the top of the air chamber 2 and suitably secured to the top of the gasolene tank 1 and thus holding the air chamber in place. A union 8 connects tube 7 to a flexible metal tube 9, connected at its other end into the leg 10 of a pressure gage 11 which is supported upon the dash 12 of the automobile. Tubes 7 and 9 thus form the connection between the air chamber 2 and the leg 10 of the pressure gage. This gage has the glass leg 13, which is calibrated in any desired units to indicate the depth of the gasolene and which communicates with the leg 10 by means of the cross connection 14 extending through the dash. The leg 13 is located on the rear side of the dash to be in view of the driver of the automobile. The area of the horizontal cross section of the air chamber 2 must be large in comparison with the cross-sectional area of the pressure tube or connection formed by the tubes 7 and 9, the larger the ratio of these areas the greater the accuracy of the device. In practice, it has been found desirable to have the ratio of approximately two hundred to one or higher.

For the purpose of reducing the amount of movement of the measuring liquid within the leg 10 of the gage 11, the internal cross-sectional area of this leg is larger than the internal cross-sectional area of the tube 9. To more accurately indicate the depth of the liquid being measured the internal cross sectional area of the leg 13 is smaller than that of the leg 10. It has been found in practice that a ratio of these areas of about one to ten is desirable. It has been found in practice that for a measuring device of this kind in order to reduce the length of leg 13 a heavy liquid within the pressure gage is highly desirable, such as one having a specific gravity of three.

As thus far described, the apparatus may be used for measuring the depth of the gasolene when the latter is under atmospheric pressure only. If it is desired to determine the depth of the gasolene under pressure other than atmospheric, a second flexible tube or connection 15 communicates with the tank 1 and above the liquid therein and with the leg 13 of the pressure gage 11.

As shown in Figs. 1, 3, 4 and 5 the pressure gage is of simple construction and can be easily and cheaply manufactured. In detail, 16 is the front plate adapted to be suitably secured to the dash 12 and having the central longitudinally-extending slot 17 in which the glass leg 13 of the gage lies. A suitable scale 18 is provided on the plate and extending adjacent to the glass leg. The upper and lower ends of the slot 17 are enlarged and are engaged in by the projections 19 upon the upper and lower blocks 20 and 21 respectively, which are secured to the front plate 16 and extend through the dash 12. The projections have the vertical bores 22 therein in which the ends of the glass leg 13 fit. The upper block 20 has the lateral central bore 23, the outer end of which is engaged by the nipple 24 which is connected to the flexible tube 15 by the union 25. The lower block 21 has the lateral central bore 26 connected into near its outer end by the vertical tube 27 which is secured to the flexible tube 9 by the union 28.

As shown in Fig. 6, the modified construction of air chamber 2 has an arrangement similar to that shown in Figs. 1 and 2 with the exception that a weight 29 is provided which consists of heavy metal attached to the air chamber. This air chamber is also provided with the tube 30 which extends from the top of the air chamber 2 to near the bottom thereof and opens into the liquid being measured at its upper end. This construction is particularly adapted for use in measuring liquids where there is considerable sediment or where the bottom upon which the air chamber rests is sandy or muddy. It is readily seen that the liquid being measured enters the air chamber near its bottom but comes from a point above the air chamber so that the liability of clogging the device and making the same inoperative is avoided.

In operation, when the air chamber 2 is immersed in the gasolene, the top and bottom, 4 and 5 respectively, being approximately horizontal, the gasolene flows into the chamber until the surface of the gasolene within the chamber closes the communication port between the air chamber and the gasolene being measured. After this, the air in the air chamber and the pressure connection becomes compressed and the gasolene eventually rises to a higher level when the pressure of the air just balances the weight of the gasolene and is therefore equal to it. A measure of the pressure reduced to proper units becomes a measure of the depth of the gasolene. It is understood that if the gasolene receptacle has a pressure therein other than atmospheric, this pressure is communicated to the gage also. A device of this kind in reality measures the depth of the gasolene above the surface of the latter in the chamber 2 and it is therefore essential that the gasolene level in the chamber be kept as close to the bottom of the chamber as possible, and clearly essential that the level of the gasolene in the chamber be kept practically uniform. In order that this may be accomplished, it is necessary that the volume of air in the air chamber shall be greater than that in the pressure tube or connection and that the air in the chamber shall be concentrated between very small vertical limits, this being accomplished by using a small enough pressure tube or connection and reducing the vertical distance between the top and bottom, 5 and 6 respectively, of the air chamber and increasing the horizontal cross-section of the air chamber. The two conditions which cause the level of the gasolene within the air chamber to fluctuate are changing depths of the gasolene and varying pressures within the pressure tube or connection and air chamber, due to the changes of temperature. My apparatus automatically corrects these sources of error within very narrow limits.

It will be readily seen from the above description that I have provided a simple construction of depth measuring device which is accurate and which may be cheaply manufactured. Furthermore, a construction is provided in which the liquid level within the air chamber remains substantially uniform under varying conditions, which accounts for the accuracy of the device. Although I have shown in the drawings the device as applied to a liquid fuel tank for an automobile, it is to be understood that the device may be applied in many different ways, such as for measuring the depths of liquids in natural bodies of water and for measuring the draft of floating objects, in which latter case the air chamber is secured to the floating object beneath the surface of the liquid in which the object is floating.

What I claim as my invention is:

1. The combination with a liquid fuel tank upon an automobile, of a glass tube mounted upon the rear side of said dash, an air chamber in said tank and communicating with the liquid fuel, a tube connecting into said air chamber, and connections between said tube and glass tube, said connections having relatively large internal cross sectional area with respect to said tube connecting into said air chamber, said glass tube having a small internal cross-sectional area relative to the cross-sectional area of said connections and said air chamber having a high ratio of cross-sectional area relative to the cross sectional area of said tube connecting thereinto.

2. In a device for indicating the depth of a liquid, the combination with an air chamber, of a hollow connection extending from the top of said chamber to near the bottom thereof and communicating with the liquid, a pressure gage, and a second connection between said gage and chamber.

3. In a device for indicating the depth of a liquid, the combination with an air chamber, of a tube communicating with the liquid and extending from the top to near the bottom of said chamber, a pressure gage, and a second tube between said gage and chamber, said chamber having a very large cross sectional area relative to the cross sectional area of said second tube and a very small height relative to the depth of the liquid being gaged.

4. In a pressure gage, the combination with a plate provided with a longitudinal slot, of upper and lower blocks secured thereto near opposite ends of said slot and provided with projections extending through said plate, and a tube engaging said blocks and positioned in said longitudinal slot, each of said blocks having a passage-way connecting with said tube, and said plate provided with graduations adjacent to one edge of said slot.

In testimony whereof I affix my signature.

HORACE W. KING.